United States Patent
Kobayashi et al.

[11] 3,883,227
[45] May 13, 1975

[54] LIQUID CRYSTAL DISPLAY DEVICES

[75] Inventors: Shunsuke Kobayashi, Wako; Tokuhide Shimojo; Kazuhiko Kasano, both of Ise, all of Japan

[73] Assignee: Ise Electronics Corporation, Ise City, Japan

[22] Filed: June 4, 1973

[21] Appl. No.: 366,969

[30] Foreign Application Priority Data
June 5, 1972 Japan............................ 47-55749

[52] U.S. Cl. ........................................ 350/160 LC
[51] Int. Cl. ........................................... G02f 1/28
[58] Field of Search ............................ 350/160 LC

[56] References Cited
UNITED STATES PATENTS

| | | | |
|---|---|---|---|
| 3,167,607 | 1/1965 | Marks et al. | 350/160 X |
| 3,512,876 | 5/1960 | Marks | 350/267 |
| 3,527,525 | 9/1970 | Marks | 350/160 X |
| 3,625,591 | 12/1971 | Freiser et al. | 350/160 LC X |
| 3,674,342 | 7/1972 | Castelland et al. | 350/160 LC X |
| 3,687,515 | 8/1972 | Haas et al. | 350/160 LC X |

Primary Examiner—Ronald L. Wibert
Assistant Examiner—Paul K. Godwin
Attorney, Agent, or Firm—Dike, Bronstein, Roberts, Cushman & Pfund

[57] ABSTRACT

In a liquid crystal display device of the type wherein a liquid crystal is interposed between a pair of confronting electrodes and a voltage is impressed across the electrodes for varying the orientation of the axes of the molecules of the liquid crystal, one of the electrodes is comprised by a pair of comb shaped electrodes disposed to correspond to a desired pattern and the teeth of the comb shaped electrodes interleave with each other.

1 Claim, 5 Drawing Figures

LIQUID CRYSTAL DISPLAY DEVICES

BACKGROUND OF THE INVENTION

This invention relates to a liquid crystal display device and more particularly to a field effect type liquid crystal display device.

In a display device including a pair of electrode plates, at least one of them being transparent, and a so-called Nematic type liquid crystal interposed between the electrode plates, when a voltage is impressed across the electrode plates the liquid crystal diffuses the light so that an observer sees milky white light. Such condition of light diffusion is known as a dynamic diffusion mode (DSM). At present, although the theory of the dynamic diffusion is not yet clearly understood it is thought that aggregation theory is the most reasonable one. According to this theory molecules of the Nematic type liquid crystal form aggregations, each consisting of about $10^5$ molecules. These aggregations have bipolar moments so that upon application of the electric field, the bipolar moments will align with the direction of the electric field. Since the direction of the major axes of the molecules are inclined with respect to the direction of the bipolar moment, the major axes of the molecules will not align with the direction of the electric field. Where an ion current is created in the liquid crystal by the action of the electric field the major axes of the molecules tend to become parallel with the ion current, thereby changing the direction of the molecules. Such alternate changing of the directions of the bipolar moments and the axes of the molecules creates dynamic diffusion of light thereby causing milky white colour due to the difference in the refractive index.

Display elements utilizing this phenomemon will soon be available on the market. Since in these elements, generation and extinguishment of ions are repeated, their response time is relatively long, ordinarily of the order of several tens microseconds. In addition, their useful life is limited to about 10,000 hours due to the chemical change of the liquid crystal.

A number of display systems which are quite different from those utilizing dynamic diffusion have also been proposed. One example is a so-called DPA system developed by AEG and Telefunken in Germany. As shown in FIG. 1, this system comprises transparent electrodes 1 and 2 of tin oxide which have been crystalized by a special heat treatment, and a special Nematic type liquid crystal 3 interposed between the electrodes. As designated by a term "vertical align" the major axes of the molecules of the special Nematic type liquid crystal 3 are aligned in a direction perpendicular to the electrodes 1 and 2. When two polarizing plates 4 and 5 having polarizing axes which intersect each other at right angles are disposed on the opposite sides of the element, even when light is projected upon the element from the rear side thereof, the element looks black due to the presence of the polarizing plates 4 and 5.

Upon application of a voltage of a suitable frequency (usually, 1 KHz) across the electrodes 1 and 2, the molecules of the liquid crystal depart from the vertical arrangement and occupy a position somewhat inclined with respect to the electrodes so that the element looks bright.

When compared with DSM system, DAP system can operate at a lower operating voltage, has longer life, higher contrast ratio and higher threshold voltage so that the DAP system is characterized by a high response speed without the fear of crosstalk.

In all prior art display devices of field effect type, it has been the common practice to subject the surface of the electrode to a special heat treatment or chemical treatment so as to orient the axes of the molecules of the liquid crystal in a direction normal to the electrode surface. However, such treatments involve difficult engineering problem, and the orientation of the molecules of of the liquid crystal varies with time.

SUMMARY OF THE INVENTION

Accordingly, it is an object of this invention to provide a new and improved liquid crystal display device capable of permanently orienting the molecules of the liquid crystal without requiring any heat or chemical treatment of the electrodes.

According to this invention, there is provided a liquid crystal display device comprising a first substrate, first and second comb shaped electrodes disposed on the first substrate to correspond to a desired pattern with the teeth of the first and second comb shaped electrodes interleaved with each other, a second substrate spaced apart a predetermined distance from the first and second electrodes, a counter electrode supported by the second substrate to confront the first and second electrodes, a field effect type liquid crystal interposed between the first and second substrates, and means for impressing a voltage across the first and second electrodes and the counter electrode for varying the orientation of the axes of the molecules of the liquid crystal.

BRIEF DESCRIPTION OF THE DRAWINGS

The invention can be more fully understood from the following detailed description taken in conjunction with the accompanying drawings in which.

DESCRIPTION OF THE PREFERRED EMBODIMENT

Figure 3:
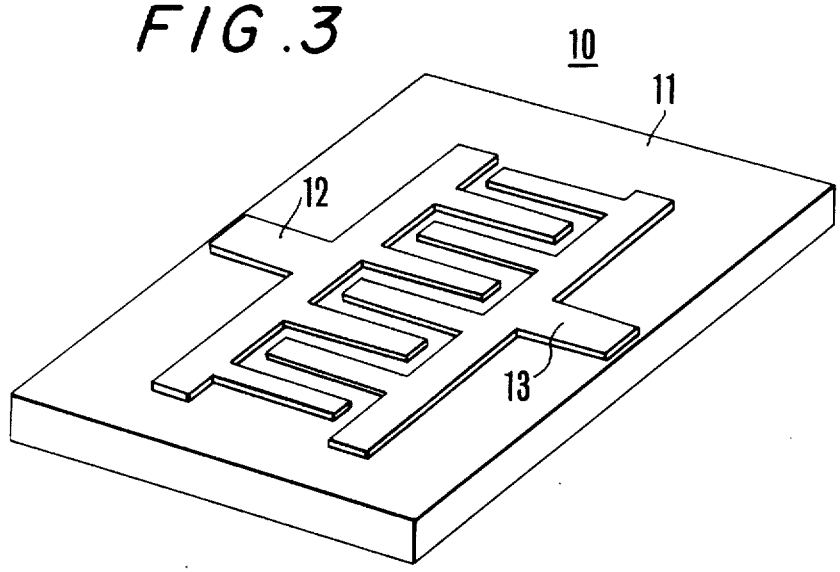
FIG. 3 is a perspective view of one example of the comb shaped electrodes utilized in the novel liquid crystal display device embodying the invention.

The electrode assembly 10 shown in FIG. 3 comprises a pair of opposed comb shaped electrodes 12 and 13 which are formed by etching a transparent conductive film applied on a glass substrate 11, such as tin oxide. The teeth of the electrodes 12 and 13 are interleaved with each other as shown in FIG. 3. It should be understood that, in the actual design, the configuration of the comb shaped electrodes 12 and 13 are selected to display a desired pattern of a letter or model.

Figure 4:
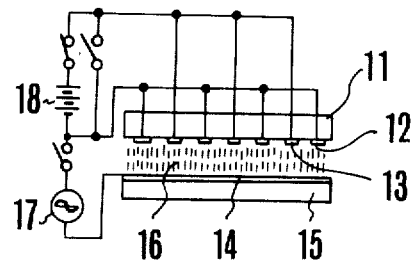
FIGS. 4 and 5 are diagrams utilized to explain the operation of the novel liquid crystal display device.

As diagrammatically shown in FIG. 4 a flat transparent counter electrode 14 is formed on a glass substrate 15 to face the comb shaped electrodes 12 and 13 with a predetermined spacing (for example 200 $\mu$m) between confronting electrodes, and a liquid crystal 16 is poured in the space between electrodes 12, 13 and counter electrode 14. Thus the display device is constituted by three electrodes 12, 13 and 14.

The operation of the display device described above will now be described in detail.

According to the theory of DAP system anounced by AEG Telefunken, when electrodes not subjected to a special treatment are used the molecules of the liquid crystal 16 would not orient in the direction perpendicular to the electrodes but the molecules are caused to incline when a transverse electric field is applied. Accordingly, when an electric field is applied in the lateral direction by connecting a DC source 18 across the comb shaped electrodes 12 and 13 as shown in FIG. 4, the molecules of the liquid crystal will orient in a given direction with respect to the electrodes (in this case, vertical direction). For this reason, when the element maintained in this condition is placed between two polarizing plates 4 and 5 having axes of polarization intersecting each other at right angles as shown in FIG. 1, the element looks black.

Figures 1, 2:
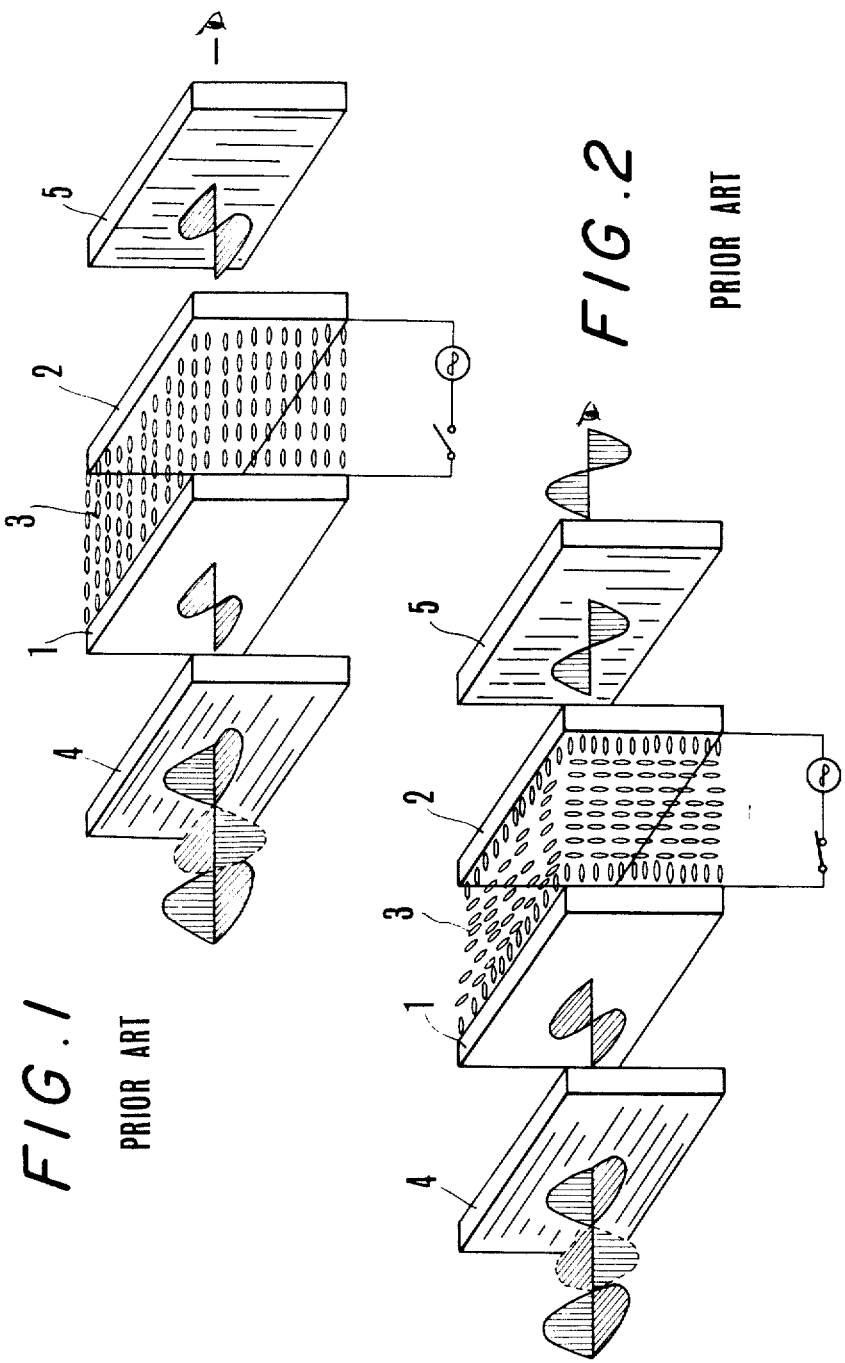
FIGS. 1 and 2 are schematic exploded views adapted to explain the operation of a prior art field effect type liquid crystal display device.
Figure 5:
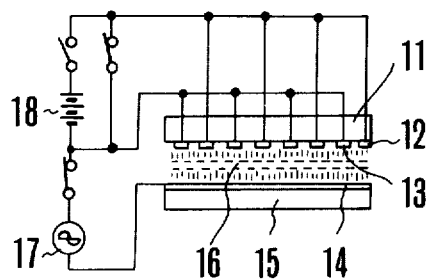

Next, as shown in FIG. 5 after removing the lateral electric field, when a longitudinal electric field is applied by connecting a source of high frequency 17 between comb shaped electrodes 12, 13 and the counter electrode 14 the orientation of the molecules will be disturbed, whereby the element looks bright similar to FIG. 2.

The method of applying the voltage described is only one example and the same object can also be attained by many other methods.

Instead of interleaving the teeth of two confronting comb shaped electrodes, the teeth of two electrodes can be superposed one upon the other, and such superposed electrodes can be prepared by multi-layer printing technique. In other words, the two comb shaped electrodes may be superposed back to back with an insulator intermediate there between, for example an upper electrode of comb electrode 13 and a lower electrode of comb electrode 12, and lead wires from the upper electrode may be passed through a perforation formed in the insulator intermediate to a surface of the glass substrate 11 on which a portion of the circuit network is formed. The leads, of course, may be connected directly to the surface of glass substrate.

As above described, the invention provides a novel liquid crystal display device capable of manifesting the desirable characteristics by merely switching bias voltages without the necessity of subjecting the electrode surface to a special heat treatment or a special chemical treatment as in the known field effect type liquid crystal display element.

While the invention has been described in terms of a preferred embodiment thereof it should be understood that many changes and modifications will be obvious to one skilled in the art without departing from the true spirit and scope of the invention as defined in the appended claims.

What is claimed is:

1. An electroresponsive element for a liquid crystal display device comprising a first substrate, first and second comb shaped electrodes disposed on a common surface of said first substrate to correspond to a desired pattern with the teeth of said first and second comb shaped electrodes interleaved with each other, a second substrate spaced apart a predetermined distance from said first and second electrodes, a counter electrode supported by said second substrate to confront said first and second electrodes, a field effect type liquid crystal interposed between said first and second substrates, the electrode surfaces of said substrates being neutral respecting orientation of the molecules of said liquid crystal, and means for impressing a direct voltage across said first and second electrodes to provide initial orientation of the axes of the molecules of said liquid crystal, a source of high frequency alternating current, means operable for connecting said source of alternating current across said counter electrode and said first and second electrodes joined as a common electrode, said means for impressing and said means operable being adapted for mutually exclusive application of said direct voltage and said alternating current.

* * * * *